United States Patent [19]
Dixon

[11] Patent Number: 5,613,362
[45] Date of Patent: Mar. 25, 1997

[54] APPARATUS AND METHOD FOR ENERGY CONVERSION USING GAS HYDRATES

[76] Inventor: Billy D. Dixon, 307 N. Dixon, Wallis, Tex. 77485

[21] Appl. No.: 319,138

[22] Filed: Oct. 6, 1994

[51] Int. Cl.[6] .................................................. F01K 25/00
[52] U.S. Cl. ........................... 60/649; 60/651; 60/671; 60/673; 60/641.7
[58] Field of Search ............................. 60/641.7, 649, 60/651, 671, 673

[56] References Cited

U.S. PATENT DOCUMENTS

| | | | |
|---|---|---|---|
| 427,400 | 5/1890 | Campbell | 60/673 |
| 609,430 | 8/1898 | Gzeattari | 60/649 |
| 750,493 | 1/1904 | Schütt | 60/649 |
| 3,967,449 | 7/1976 | Beck | 60/641 |
| 4,007,787 | 2/1977 | Cottle | 166/267 |
| 4,009,575 | 3/1977 | Hartman, Jr. et al. | 60/673 |
| 4,090,361 | 5/1978 | Terry et al. | 60/649 |
| 4,104,883 | 8/1978 | Naef | 60/641 |
| 4,189,924 | 2/1980 | LaCoste | 60/641 |
| 4,198,827 | 4/1980 | Terry et al. | 60/649 |
| 4,249,383 | 2/1981 | Molini et al. | 60/641 |
| 4,275,563 | 6/1981 | Kuroda et al. | 60/673 |
| 4,292,808 | 10/1981 | Lohmiller | 60/673 |
| 4,302,682 | 11/1981 | LaCoste | 290/1 R |
| 4,333,313 | 6/1982 | Cardone et al. | 60/649 |
| 4,355,513 | 10/1982 | Girden | 60/641.7 |
| 4,358,931 | 11/1982 | Terry et al. | 60/649 |
| 4,387,576 | 6/1983 | Bissell | 60/649 |
| 4,430,861 | 2/1984 | Avery | 60/675 |
| 4,449,577 | 5/1984 | Alfvén et al. | 60/659 |
| 4,476,249 | 10/1984 | Avery | 518/703 |
| 4,481,775 | 11/1984 | Beveridge | 60/673 |
| 4,485,629 | 12/1984 | LeGoff | 60/673 |
| 4,726,191 | 2/1988 | Kawamura | 60/641.7 |
| 4,781,029 | 11/1988 | SerVaas | 60/641.7 |

*Primary Examiner*—Leonard E. Heyman
*Attorney, Agent, or Firm*—Russell D. Culbertson; Shaffer & Culbertson

[57] ABSTRACT

An encagement vessel contains water and a working gas capable of forming hydrate with the water. A heat exchange arrangement is associated with the encagement vessel for removing heat from the working gas and water in the encagement vessel to form gas hydrate at an initial temperature. A working gas supply continues to add working gas to the encagement vessel as heat is removed in order to maintain the equilibrium pressure of the gas hydrate at the equilibrium pressure associated with the initial temperature as the hydrate is formed. An equilibrium pressure shifting arrangement increases the equilibrium pressure of the gas hydrate to an end pressure. A dissociating heat exchanger is included for adding heat to the hydrate at the end equilibrium pressure to dissociate the gas hydrate into water and working gas at the end pressure. A suitable gas valve is associated with the vessel in which dissociation is performed in order to remove gas hydrate at the end pressure and maintain the pressure in the vessel at the end pressure as the hydrate is dissociated. The working gas released at the high end pressure may be directed to a suitable gas turbine for driving the turbine to produce mechanical energy that can in turn be used to produce electricity through a suitable generator.

15 Claims, 3 Drawing Sheets

APPARATUS AND METHOD FOR ENERGY CONVERSION USING GAS HYDRATES

BACKGROUND OF THE INVENTION

This invention relates to an apparatus for converting energy to some useful form and particularly to an apparatus and method for energy conversion using gas hydrates.

Electrical power is commonly produced using a high temperature and high pressure gas, such as super heated steam, to drive a turbine. The turbine then is used to drive a generator to produce electricity. Most of the cost of producing electricity is in the fuel used to produce the high temperature and high pressure gas for driving the turbine. Alternatively to burning a fuel to produce steam, the turbine can be driven directly by the combustion products of the fuel. In either case, the system converts energy from a compressed gas using the turbine or similar device.

Gas hydrates, hereafter sometimes referred to simply as "hydrates", are crystalline structures of water and a host gas molecule. Numerous different types of gases form hydrates, including methane and nitrogen. As used in this disclosure, "working gas" means any gas or mixture of gases capable of forming gas hydrate with water. The gas hydrate crystal can have one of two forms, each having a geometrically figured cell made up of a number of water molecules and a number of cavities. Structure I is a body centered cubic cell containing 46 water molecules per unit cell with 3 small cavities and 6 large cavities. Structure II is a diamond lattice cell containing 136 water molecules per unit cell with 16 small cavities and 8 large cavities. The cavities are filled with a host gas or gases such as hydrocarbon gases in order to stabilize the molecules. In hydrates formed with hydrocarbon host gases, only methane fills the small cavities while methane, ethane, propane, i-butane, n-butane, and n-pentane fill the large cavities.

Gas hydrates have an unusual vapor pressure-temperature relationship in that the vapor pressure increases exponentially with a linear increase in temperature. For example, pure methane hydrate has a vapor pressure of 410 psia at 35° F. and a vapor pressure of 2,043 psia at 62° F. Thus, at a compression ratio of 4, the temperature of the gas forming the hydrate is only increased by 27° F. By contrast, a normal adiabatic compressor would increase gas temperature by 225° F. in order to achieve a compression ratio of 4. This increased temperature in adiabatic compression represents wasted energy not necessary to compress the gas.

The invention disclosed herein takes advantage of this unique property of gas hydrates to provide near-isothermal compression of gases. The gas may be used to drive a turbine or other device in order to convert energy from the compressed gas to electricity, for example.

SUMMARY OF THE INVENTION

It is a general object of the invention to provide an apparatus and method for energy conversion using gas hydrates.

To accomplish this objective, the apparatus according to the invention includes an encagement arrangement for forming hydrate, means for shifting the equilibrium pressure and temperature of the hydrate, and means for dissociating the hydrate. According to the method of the invention, the apparatus first forms hydrate at an initial temperature. After hydrate formation, the method includes increasing the equilibrium pressure of the hydrate to an end pressure. Finally, the apparatus dissociates the hydrate at the end equilibrium pressure to form gas and water at the end pressure. The gas at this higher end pressure may be used to drive a turbine and thereby convert the energy from the high pressure gas to mechanical energy.

The encagement arrangement includes an encagement vessel capable of holding working gas and water used to form the hydrate. The encagement arrangement also includes encagement means comprising an encagement heat exchanger and a low pressure gas supply. The encagement heat exchanger is associated with the vessel for removing heat at the initial hydrate forming temperature. The gas supply is also associated with the encagement vessel for providing working gas as heat is removed in the hydrate formation process and ensuring sufficient gas to form additional hydrate.

The equilibrium pressure of the hydrate may be shifted either by raising the temperature of the hydrate from the initial temperature or introducing an electrolyte or other equilibrium pressure shifting substance to the water encaged in the hydrate. In either case, the step of raising the equilibrium pressure of the hydrate may be performed in the encagement vessel in which the hydrate was formed or the step may be performed after moving the hydrate to another vessel. To raise the equilibrium pressure of the hydrate by increasing temperature, heat is added to the hydrate by a suitable heat exchanger associated with whatever vessel is used to contain the hydrate. To increase the hydrate equilibrium pressure by introducing an electrolyte or other substance, the hydrate is exposed directly to the substance, enabling the substance to enter the water encaged within the hydrate. The equilibrium pressure shifting means in this form of the invention includes the structure for exposing the hydrate to the electrolyte or other substance.

After raising the equilibrium pressure of the hydrate, the hydrate is dissociated to produce high pressure gas and water. The dissociation step may be performed in the same vessel in which the hydrate is formed and the equilibrium pressure shifted, or may be performed after moving the hydrate to a different vessel. In either case, dissociation is accomplished by adding heat to the hydrate at the increased equilibrium pressure while maintaining the equilibrium pressure at the desired end pressure. The additional energy at constant pressure functions to dissociate the hydrate. Heat is added through a suitable heat exchanger associated with the vessel containing the hydrate, and the pressure is maintained by removing already dissociated gas through a suitable constant pressure valve associated with the vessel. The heat exchanger structure for adding heat to the hydrate, and the constant pressure valve for maintaining a constant pressure in the vessel containing the hydrate comprise dissociation means.

The method and apparatus of the invention perform near-isothermal compression to produce high pressure gas. Thus, the apparatus and method do not waste energy consumed in heating the gas during adiabatic compression. Energy is converted from the hydrate in the form of the high pressure gas, and the increased pressure may be used for storing or shipping the gas. However, in the preferred form of the invention, the energy is converted from the high pressure gas by using the gas to operate a turbine and produce mechanical energy, which in turn may be used to drive a generator to produce electrical power.

These and other objects, advantages, and features of the invention will be apparent from the following description of the preferred embodiments, considered along with the accompanying drawings.

DESCRIPTION OF THE PREFERRED EMBODIMENTS

Figure 1:
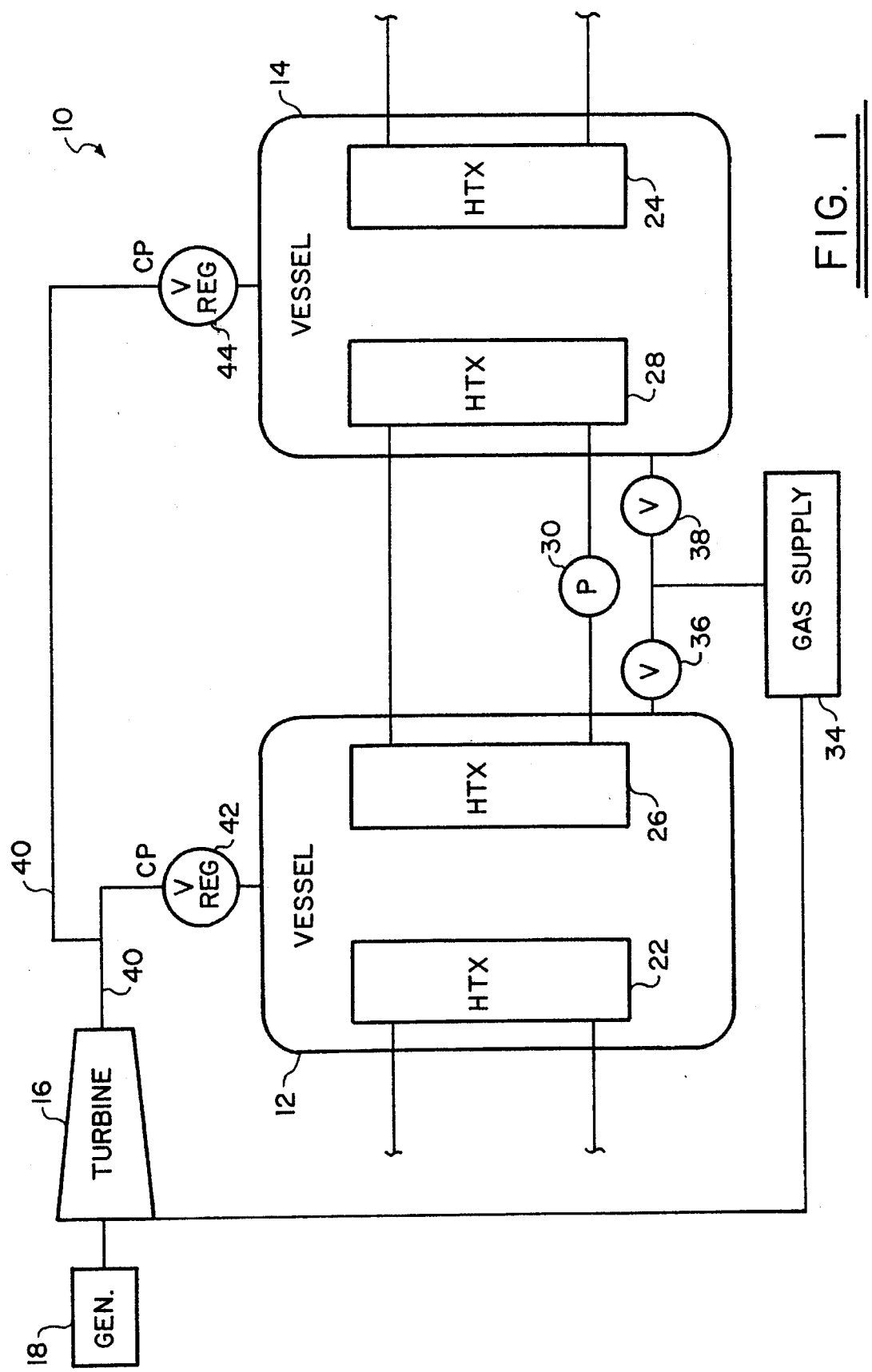
FIG. 1 is a diagrammatic view showing a form of the invention utilizing heat to shift the equilibrium pressure of the hydrate.

FIG. 1 illustrates an energy conversion apparatus 10 embodying the principles of the invention. The apparatus 10 includes two separate vessels 12 and 14, each for use in forming or encaging hydrate, heating the hydrate to increase the hydrate equilibrium pressure, and for dissociating the hydrate at the increased equilibrium pressure. This form of the invention also includes a turbine 16 and generator 18. The turbine 16 is driven by the high pressure gas released from the vessels 12 and 14, and in turn operates the generator 18 to produce electricity. Although the turbine 16 and generator 18 are shown as a preferred use of the high pressure gas, the apparatus according to the invention may be used to compress gas for other uses, such as storage or shipment in a pipeline.

Each vessel 12 and 14 has associated with it a heat exchanger 22 and 24, respectively, that circulates a suitable heat exchange fluid from a chiller/heater (not shown). In addition to the heat exchangers 22 and 24, the vessels 12 and 14 also include heat exchangers 26 and 28, respectively. The exchangers 26 and 28 are connected to exchange or circulate a suitable heat exchange fluid such as methanol, and a pump 30 is included to transfer fluid between the heat exchangers.

Working gas, such as methane, for example, is supplied to each vessel 12 and 14 through the low pressure gas supply 34. The low pressure gas supply 34 is controlled through suitable valves 36 and 38. Also, the low pressure gas supply 34 receives low pressure gas from the outlet of the turbine 16 after the gas is used to drive the turbine. A high pressure gas conduit 40 extends from each vessel 12 and 14 to the turbine 16 inlet, and constant pressure valves 42 and 44 control the release of high pressure gas from the vessels 12 and 14, respectively.

The vessels 12 and 14 are alternatively used to produce hydrate, shift the hydrate equilibrium pressure, and then to dissociate the hydrate into high pressure gas and water. Although an apparatus according to the invention may include only one vessel, the two-vessel version of the invention shown in FIG. 1 helps maintain a constant supply of high pressure gas and also improves efficiency by heat exchange between the vessels with heat exchangers 26 and 28, as discussed below.

Neglecting for the moment operation of vessel 14, vessel 12 is first supplied with water from a suitable supply (not shown) and the working gas from gas supply 34 at an initial temperature. The hydrate formation process includes removing heat from the water and gas with the heat exchanger 22, while continuously providing gas at an initial temperature through the gas inlet valve 36. Thus the heat exchanger 22 and gas supply operate as encagement means for forming hydrate within the vessel 12. Once the desired amount of hydrate is formed in the vessel 12, the gas inlet valve 36 is closed and heat exchanger 22 is operated to prevent further heat from being removed from the vessel.

The method of the invention then continues by increasing the equilibrium pressure of the hydrate in vessel 12 to a desired end pressure capable of operating the turbine 16. In this form of the invention, the equilibrium pressure is increased by heating the hydrate in the vessel 12, using heat exchanger 22, to an end temperature corresponding with the desired end equilibrium pressure. When the heat exchanger 22 is used to increase the equilibrium pressure of the hydrate, the heat exchanger 22 functions as a compressing heat exchanger. Once the end equilibrium pressure is reached, the hydrate is dissociated into water and gas at the end equilibrium pressure. Dissociation is performed by adding additional heat to the hydrate in the vessel 12 through the heat exchanger 22 while allowing gas dissociated by the added heat to exit the vessel through the constant pressure valve 42. In this phase of operation, the heat exchanger 22 operates as a dissociating heat exchanger. The constant pressure valve 42 maintains the pressure in the vessel 12 at the end pressure and in conjunction with heat exchanger 22 forms dissociating means for dissociating hydrate in the vessel 12 at a constant pressure. The high pressure gas released through the constant pressure valve 42 flows through the conduit 40 to drive the turbine 16 and then returns as low pressure gas to the gas supply vessel 34.

The second vessel 14 operates through the same hydrate formation, heating, and dissociation cycle, but out of phase with the first vessel. In this way, the turbine 16 is supplied with a constant supply of high pressure gas for constant operation. Also, after dissociating hydrate in vessel 12, heat from water and gas remaining in the first vessel 12 may be transferred through heat exchangers 26 and 28 to help heat hydrate already formed in the vessel 14. Whether the heat is used to heat the hydrate in vessel 14 or not, after hydrate is dissociated in the first vessel 12, heat must be removed from the vessel to cool the remaining gas and water for another hydrate formation cycle.

Although two vessels 12 and 14 are shown in FIG. 1, more than two vessels may be employed, each operating out of phase with respect to the other vessels to ensure a constant supply of high pressure gas to a turbine. Also, those skilled in the art will readily appreciate that the heat exchangers 26 and 28, although helpful in increasing the efficiency of the system, are unnecessary to the invention and that the heat transfer required for hydrate formation, heating, and dissociation may be obtained through the primary heat exchangers 22 and 24. Any heat exchanger arrangement that provides the required heat exchange for hydrate formation, increased equilibrium pressure, and then dissociation is equivalent to that shown for purposes of the following claims is encompassed within the scope of the invention.

Figure 2:
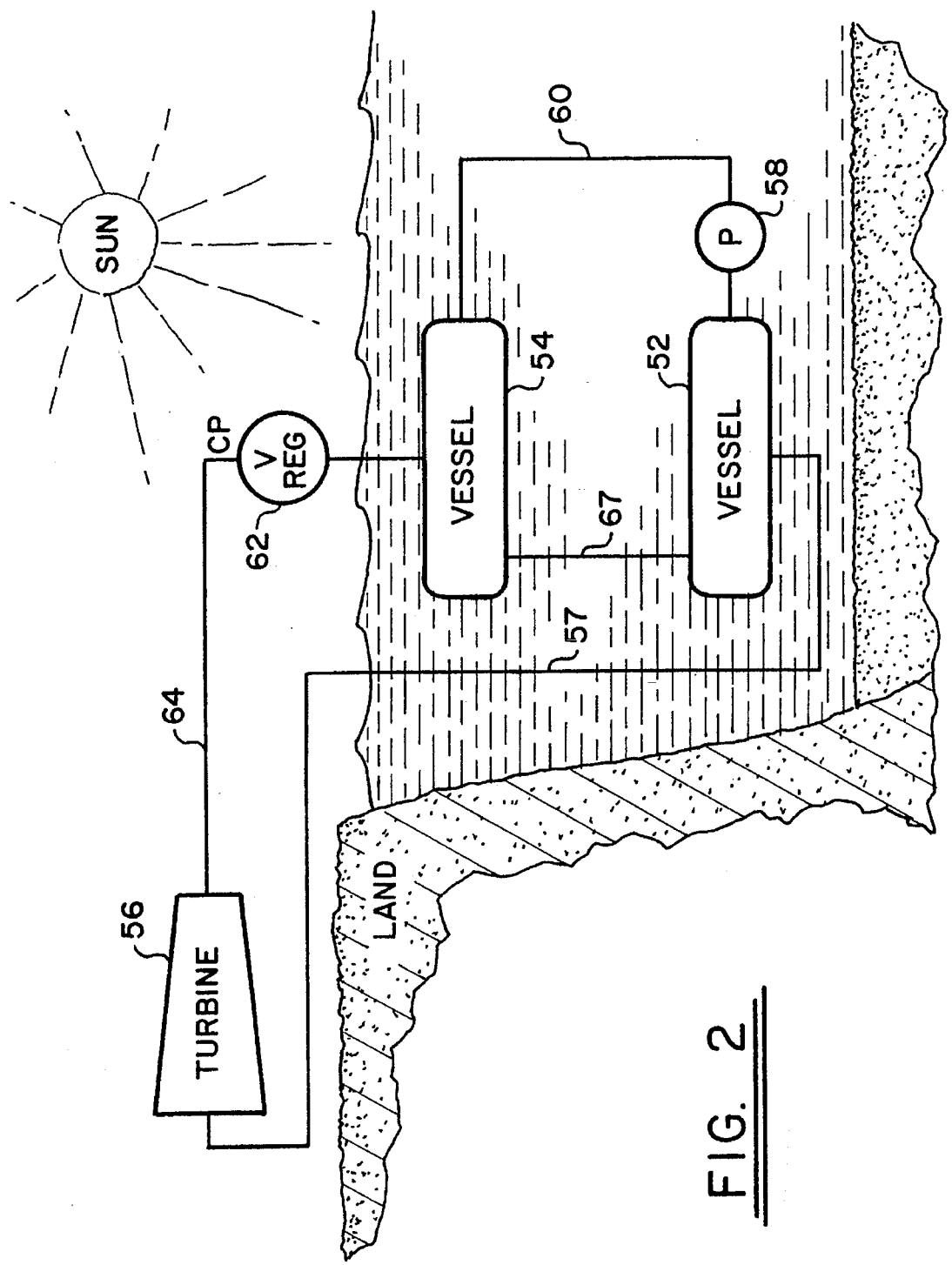
FIG. 2 is a diagrammatic view showing a form of the invention in which ocean water is used both to remove heat for encaging hydrate and for supplying heat to raise the equilibrium pressure and dissociate hydrate.

FIG. 2 shows a form of the invention which takes advantage of variations in ocean water temperature to provide the desired heat exchange for hydrate formation, equilibrium pressure increase, and dissociation. Also, this form of the invention includes a separate encagement vessel 52 in which hydrate is formed and a dissociation vessel 54 in which the hydrate is heated to increase the equilibrium pressure and also dissociate it. The gas from the dissociated hydrate is used similarly in the turbine 56, and the low pressure gas from the turbine is returned through low pressure conduit 57 to the encagement vessel 52 for reuse in the system.

In the form of the invention shown in FIG. 2, low pressure gas is supplied to the encagement vessel 52 along with water, and heat is removed by heat transfer with cool ocean water to form or encage hydrate. A pump 58 and hydrate transfer conduit 60 transfers the hydrate produced in the encagement vessel 52 to the dissociation vessel 54 at an initial temperature. Once contained within the dissociation vessel 54, the hydrate is heated by heat transfer with warm ocean water to raise the temperature of the hydrate to that corresponding to the desired end equilibrium pressure. After that point, the hydrate is heated further by the relatively warm surface ocean water to dissociate gas at the end pressure, and the dissociated gas is released through a constant pressure valve 62 and directed to the turbine 56 through high pressure conduit 64. Gas and water remaining in the dissociation vessel 54 after the hydrate is dissociated may be returned to the encagement vessel 52 through conduit 67.

Although FIG. 2 shows heat exchange only with ocean water through the vessels 52 and 54 themselves, additional heat exchange may be required or desirable to form hydrate, produce the desired equilibrium pressure shift, and also to dissociate the hydrate. Therefore, additional heat exchangers (not shown) may be associated with each vessel 52 and 54, along with heating and chilling equipment to produce the fluid used by such additional heat exchangers. However, even if additional heat exchange is required, the "artificial" heat exchange required will be substantially less than would otherwise be required due to the heat exchange with the ocean water.

Figure 3:
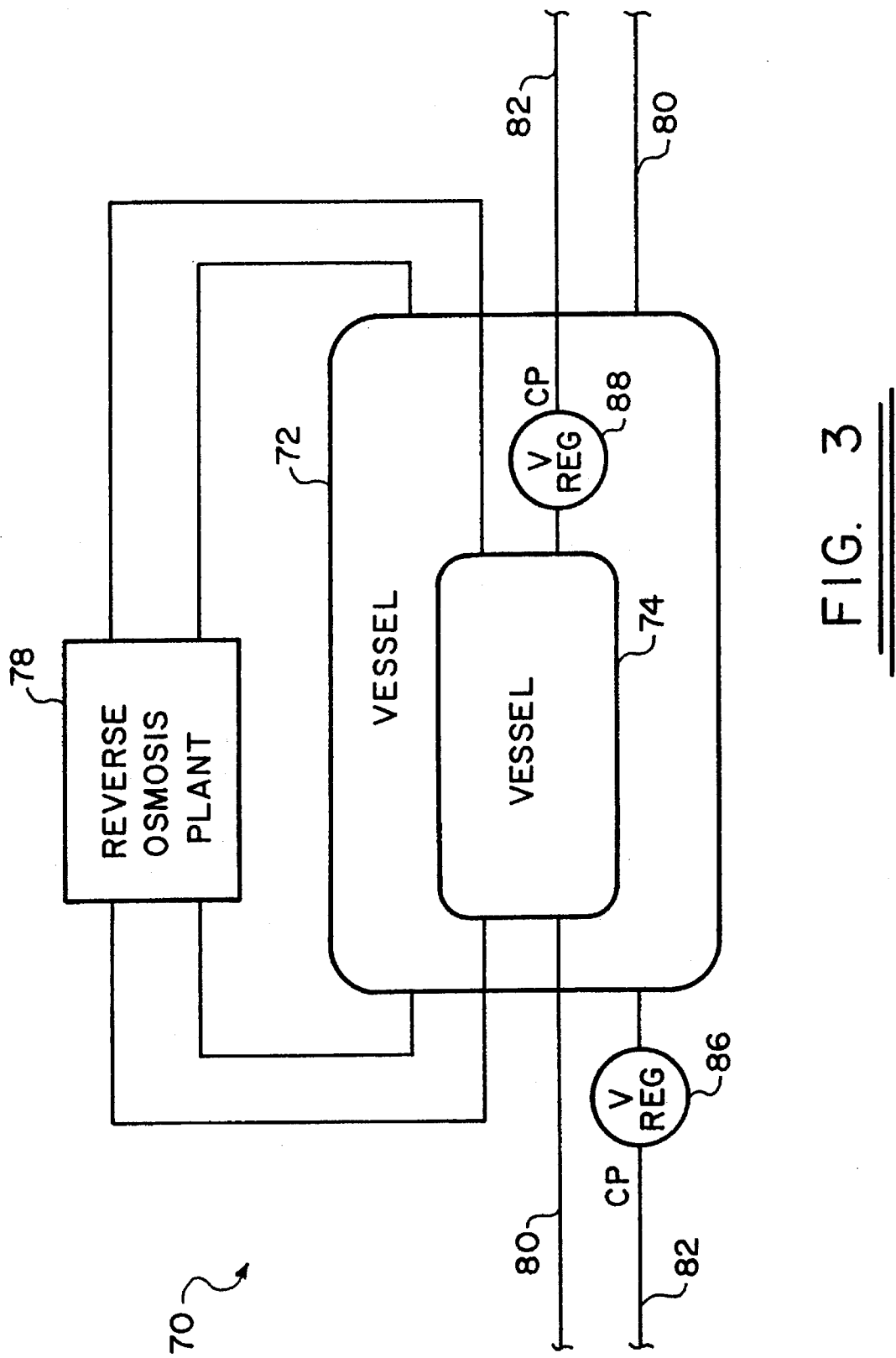
FIG. 3 is a diagrammatic view of an alternate form of the invention in which an electrolyte is used to increase the hydrate equilibrium pressure.

FIG. 3 shows an alternate form of the invention that includes different means for raising the equilibrium pressure of hydrate. In the form of the invention shown in FIG. 3, hydrate is formed similarly to the embodiments shown in FIGS. 1 and 2, however, equilibrium pressure of the hydrate is increased by adding an electrolyte to the water encaged in the hydrate. The electrolyte is added by exposing the hydrate to a concentrated salt water solution until the desired equilibrium end pressure is reached. The apparatus 70 shown in FIG. 3 includes a first vessel 72 and a second vessel 74 in a heat exchange relationship with each other. The vessels 72 and 74 may be formed one within the other as shown in the drawing, or separated with heat exchangers (not shown) connecting to the two vessels such as the heat exchangers 26 and 28 shown in FIG. 1. Each vessel 72 and 74 is used in forming hydrate, increasing the equilibrium pressure of the hydrate, and dissociating the hydrate to form high pressure gas. The apparatus 70 also includes a reverse osmosis plant 78, for producing salt water needed to raise the equilibrium pressure of hydrate to the desired level and for processing effluent solutions from the vessels 72 and 74. The reverse osmosis plant 78 and lines and pumps associated therewith for circulating salt water to and from vessels 72 and 74 operate as equilibrium shifting means in this form of the invention. Gas supply lines 80 are included to supply gas for forming hydrate similarly to the embodiments shown in FIGS. 1 and 2. High pressure gas conduits 82 remove gas from the vessels 72 and 74 through constant pressure valves 86 and 88, respectively. Although not shown in FIG. 3, the high pressure gas can be used to drive a turbine such as shown in FIG. 1, and then the low pressure gas may return to a low pressure gas supply vessel (not shown in FIG. 3) to recycle through the vessels. However, considering the energy requirements for the reverse osmosis plant 78, a more practical use of the apparatus shown in FIG. 3 would be simply compressing the working gas for storage or transport through a pipeline.

Those skilled in the art will readily appreciate that substances other than electrolytes may serve to increase the hydrate equilibrium pressure according to the invention. Although the apparatus shown in FIG. 3 is described as using an electrolyte solution, substances such as methanol or triethylene glycol may be used and are to be considered equivalent to an electrolyte solution for purposes of this disclosure and the accompanying claims.

In operation of the apparatus 70 shown in FIG. 3, hydrate is formed in one vessel while hydrate is being dissociated in the other vessel. To illustrate the process, first water and low pressure gas may be supplied to vessel 74, while vessel 72 already contains hydrate formed with pure water. At this point, salt water is circulated from the reverse osmosis plant 78 to the vessel 72 to add electrolyte to the hydrate therein and increase the equilibrium pressure of the hydrate and decrease the equilibrium temperature. To dissociate the hydrate in vessel 72, hydrate in the vessel removes heat from vessel 74, thus forming hydrate in vessel 74, as the hydrate in vessel 72 is dissociated. Heat from vessel 74 dissociates the hydrate in vessel 72 as gas is released at the desired end equilibrium pressure through the constant pressure valve 86. Thus at this point in the process, vessel 72 and the low pressure gas supply serve as encagement means for vessel 74, and vessel 74 along with the constant pressure valve 86 serve as a dissociation means for vessel 72. After the hydrate in vessel 72 is completely dissociated, the vessel is flushed with fresh water from the reverse osmosis plant 78 and readied to form additional hydrate as the hydrate now formed in vessel 74 is subjected to salt water to raise its equilibrium pressure and lower its equilibrium temperature. The hydrate in vessel 74 then removes heat from vessel 72 to again form pure water hydrate in vessel 72. Thus, the apparatus 70 shown in FIG. 3 has the advantage of using heat from the hydrate dissociation and formation process very efficiently. The primary use of energy in the process is in running the reverse osmosis plant 78 to provide the required salt water and fresh water and effluent processing.

Those skilled in the art will readily appreciate that a number of different arrangements may be used to perform the hydrate formation, equilibrium pressure increase, and dissociation according to the method of the invention. For example, the devices shown in FIGS. 1 through 3 show a pressure increase to an end pressure in one stage. However, an apparatus according to the invention could be used to perform the desired pressure increase in two or more stages. Furthermore, numerous heat exchanger arrangements could be employed to provide the required heat transfer in producing and dissociating hydrate, and any such heat exchange arrangement would be equivalent to those shown. Those heat exchanger arrangements shown in the drawings represent only 16 the currently preferred heat exchanger arrangements.

The above described preferred embodiments are intended to illustrate the principles of the invention, but not to limit the scope of the invention. Various other embodiments and modifications to these preferred embodiments may be made by those skilled in the art without departing from the scope of the following claims.

I claim:

1. A method for converting energy using gas hydrates, the method comprising the steps of:

(a) forming gas hydrate at an initial temperature from a working gas and water;

(b) increasing the equilibrium pressure of the gas hydrate to an end pressure; and (c) dissociating the gas hydrate into water and working gas at the end pressure.

2. The method of claim 1 further comprising the step of:
   (a) driving a gas turbine with the working gas at the end pressure.
3. The method of claim 1 wherein the step of forming gas hydrate comprises the steps of:
   (a) removing heat from the working gas and water at the initial temperature, while adding working gas to maintain the equilibrium pressure of the hydrate being formed at the initial temperature.
4. The method of claim 1 wherein the step of increasing the equilibrium pressure of a gas hydrate comprises the step of:
   (a) increasing the temperature of the gas hydrate from the initial temperature to an end temperature at which the equilibrium pressure of the gas hydrate equals the end pressure.
5. The method of claim 1 wherein the step of increasing the equilibrium pressure of the gas hydrate comprises the step of:
   (a) adding an equilibrium shifting substance to the gas hydrate at the initial temperature so that the substance enters the water encaged in the gas hydrate to increase the hydrate equilibrium pressure.
6. The method of claim 1 wherein the step of dissociating the gas hydrate comprises the steps of:
   (a) adding heat to the gas hydrate when the gas hydrate is at an equilibrium pressure equal to the end pressure; and
   (b) simultaneously maintaining the gas hydrate at the end pressure by releasing working gas at the end pressure.
7. The method of claim 1 wherein the hydrate is formed in a first vessel and dissociated in a second vessel and further comprising the step of:
   (a) transferring gas hydrate at the initial temperature from the first vessel to the second vessel.
8. The method of claim 1 including the step of applying heat from working gas and water left after dissociating hydrate to raise the equilibrium pressure of gas hydrate in a second vessel.
9. The method of claim 3 wherein the step of removing heat from the working gas and water at the initial temperature is performed by exchanging heat with the working gas and water at the initial temperature with cool ocean water.
10. An apparatus for converting energy using gas hydrates, the apparatus comprising:
    (a) an encagement vessel for containing water and a working gas capable of forming hydrate with the water;
    (b) working gas input means connected to the encagement vessel for selectively adding working gas to the encagement vessel;
    (c) working gas outlet means connected to the encagement vessel for selectively releasing working gas from the encagement vessel at an end pressure; and
    (d) heat exchange means associated with the encagement vessel for selectively:
       (i) removing heat from the working gas and water in the encagement vessel while maintaining the working gas and water at an initial temperature, thereby forming hydrate within the encagement vessel,
       (ii) increasing the temperature of the hydrate in the encagement vessel from the initial temperature to an end temperature at which an equilibrium pressure of the hydrate equals an end pressure, and
       (iii) adding heat to the hydrate in the encagement vessel while the working gas outlet means releases working gas from the encagement vessel at the end pressure.
11. The apparatus of claim 10 further including:
    (a) a gas turbine capable of operating with the working gas at the end pressure; and
    (b) a high pressure gas conduit connected to the working gas outlet means for delivering the working gas at the end pressure to an input of the turbine.
12. An apparatus for converting energy using gas hydrates, the apparatus comprising:
    (a) an encagement vessel for containing water and a working gas capable of forming hydrate with the water;
    (b) working gas input means connected to the encagement vessel for selectively adding working gas to the encagement vessel;
    (c) encagement heat exchange means associated with the encagement vessel for removing heat from the working gas and water in the encagement vessel while maintaining the working gas and water at an initial temperature, thereby forming hydrate within the encagement vessel;
    (d) a dissociation vessel connected to receive hydrates produced in the encagement vessel;
    (e) hydrate transfer means for moving the hydrate formed in the encagement vessel to the dissociation vessel;
    (f) working gas outlet means connected to the dissociation vessel for selectively releasing working gas from the dissociation vessel at an end pressure; and
    (g) second heat exchange means associated with the dissociation vessel for increasing the temperature of hydrate contained in the dissociation vessel to an end temperature at which an equilibrium pressure of the hydrate equals an end pressure, and for adding heat to the hydrate in the dissociation vessel as working gas is released from the dissociation vessel at the end pressure through the working gas outlet means.
13. The apparatus of claim 12 wherein:
    (a) the encagement heat exchange means utilizes cool ocean water as a heat exchange fluid to remove heat from the working gas and water in the encagement vessel;
    (b) the encagement vessel is positioned adjacent to the cool ocean water utilized by the encagement heat exchange means; and
    (c) the dissociation vessel is at a location remote from the encagement vessel and the encagement heat exchange means.
14. An apparatus for converting energy using gas hydrates, the apparatus comprising:
    (a) an encagement vessel for containing water and a working gas capable of forming hydrate with the water;
    (b) working gas input means connected to the encagement vessel for selectively adding working gas to the encagement vessel;
    (c) working gas outlet means connected to the encagement vessel for selectively releasing working gas from the encagement vessel at an end pressure;
    (d) heat exchange means associated with the encagement vessel for selectively:
       (i) removing heat from the working gas and water in the encagement vessel while maintaining the working gas and water at an initial temperature to thereby form hydrate within the encagement vessel, and
       (ii) adding heat to the hydrate in the encagement vessel while the working gas outlet means releases working gas from the vessel at the end pressure; and (e) equilibrium shifting substance pumping means for adding an equilibrium shifting substance to the hydrate formed in the encagement vessel to thereby increase an equilibrium pressure of the hydrate in the encagement vessel to the end pressure.

15. The apparatus of claim 14 wherein the equilibrium pressure shifting substance is salt water.

* * * * *

UNITED STATES PATENT AND TRADEMARK OFFICE
CERTIFICATE OF CORRECTION

PATENT NO. : 5,613,362
DATED : March 25, 1997
INVENTOR(S) : Billy D. Dixon It is certified that error appears in the above-identified patent and that said Letters Patent is hereby corrected as shown below:

Column 6, line 51, delete the number "16".

Signed and Sealed this

Twenty-second Day of July, 1997

*Attest:*

*Attesting Officer*

BRUCE LEHMAN
*Commissioner of Patents and Trademarks*